(12) United States Patent
Caldwell et al.

(10) Patent No.: US 10,637,893 B2
(45) Date of Patent: Apr. 28, 2020

(54) MEDIA GATEWAY

(71) Applicant: Metaswitch Networks Ltd, Enfield (GB)

(72) Inventors: Andrew Caldwell, Enfield (GB); Nicholas Peter Larkin, London (GB); Michael Jeffrey Evans, Abbotts Langley (GB); Matthew Williams, London (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 16/028,205

(22) Filed: Jul. 5, 2018

(65) Prior Publication Data

US 2019/0014157 A1 Jan. 10, 2019

(30) Foreign Application Priority Data

Jul. 6, 2017 (GB) .................................. 1710863.0

(51) Int. Cl.
*H04L 29/06* (2006.01)
*H04L 12/813* (2013.01)

(52) U.S. Cl.
CPC ...... *H04L 65/1023* (2013.01); *H04L 65/1016* (2013.01); *H04L 65/1066* (2013.01); *H04L 65/608* (2013.01); *H04L 47/20* (2013.01); *H04L 69/08* (2013.01)

(58) Field of Classification Search
CPC ... H04L 65/103; H04L 65/608; H04L 65/403; H04L 65/1016; H04L 65/1023; H04L 65/1066; H04L 65/1069; H04L 65/1073; H04L 69/08
See application file for complete search history.

(56) References Cited

U.S. PATENT DOCUMENTS

| | | | |
|---|---|---|---|
| 2008/0137671 A1 | 6/2008 | Agarwal et al. | |
| 2011/0099146 A1* | 4/2011 | McAlister et al. | |
| 2011/0282672 A1* | 11/2011 | Creamer et al. | |
| 2012/0300017 A1 | 11/2012 | Li et al. | |
| 2013/0250779 A1* | 9/2013 | Meloche et al. | |
| 2014/0082206 A1* | 3/2014 | Samuell et al. | |
| 2016/0072868 A1* | 3/2016 | Poulin | |

FOREIGN PATENT DOCUMENTS

GB 2538755 A 11/2016

OTHER PUBLICATIONS

European extended search report dated Oct. 30, 2018 on related Application No. EP 18181989.7, filed Jul. 5, 2018.
United Kingdom Combined Search and Examination Report dated Dec. 14, 2017 on related Application No. GB 1710863.0, filed Jul. 6, 2017.
ITU-T H.248.1: Gateway control protocol: Version 3 See section 11.1. Mar. 2013.

* cited by examiner

*Primary Examiner* — Marsha D Banks Harold
*Assistant Examiner* — Dharmesh J Patel
(74) *Attorney, Agent, or Firm* — EIP US LLP

(57) ABSTRACT

A media gateway and method with a media session manager function, a media processor function, and a media session state datastore function. The functions are provided by one or more instantiations which allow for independent scalability of the functions in the media gateway.

18 Claims, 3 Drawing Sheets

MEDIA GATEWAY

CROSS-REFERENCE TO RELATED APPLICATIONS

This application claims priority to United Kingdom Application No. GB 1710863.0, filed Jul. 6, 2017, under 35 U.S.C. § 119(a). The above-referenced patent application is incorporated by reference in its entirety.

BACKGROUND OF THE INVENTION

Technical Field

The present invention relates to a media gateway or media gateway service. In particular, but not exclusively, the present invention relates to a media gateway comprising a media session manager function, a media processor function, and a separate media session state datastore function.

Background

Media gateways, for example Voice over Internet Protocol (VoIP) media gateways, have traditionally used 1+1 active-standby redundancy ('High Availability (HA) pairs'). This means that 50% of the media handling capacity is idle at any one time, which is wasteful.

Furthermore, in a Network Functions Virtualization (NFV) context, an HA pairs design can be problematic because it creates complex constraints on orchestrators which are required to scale the overall service one pair at a time, and which need to make sure that of a given pair, one instance is always up and running. Known systems which involve the co-location of media handling function (such as Digital Signal Processors (DSPs)) and control function (such a Gateway Control Protocol (or 'Megaco' or 'H.248') stack) have inefficient resource allocation.

An N-way redundancy model (also known as 'active/active') avoids issues related to 1+1 active/standby. It means that a service is implemented on multiple instances, all of which are handling a subset of the overall traffic. If an instance fails, the work it was handling upon failure is relocated to other instances in the cluster. A fraction of the capacity of each instance can be kept unallocated for use in the case of failure (rather than for example concentrating all the spare capacity in a single standby instance). The fraction is less than 50% in a 1+1 system.

Some known systems decompose a Session Border Controller (SBC) into signalling and media elements.

Domain Name Service (DNS) can be employed for load-balancing purposes in relation to Real-time Transport Protocol (RTP). However, the vast majority of VoIP devices do not support receiving a domain name as an RTP address (in Session Description Protocol (SDP) data).

Layer 2/3 failover can be implemented using virtual Internet Protocol (vIP), virtual Media Access Control (vMAC), or propagating routing table updates on failover. Such known systems are either limited to a single Local Area Network (LAN) or involve a large amount of routing table churn that has to be propagated across the network (which causes updates to be delayed, and uses up processor time and network bandwidth).

Some known systems employ a dedicated load-balancer; however, such a load balancer must be able to discover when media processors become available/go unavailable in order to load-balance correctly.

Some known systems accept that a Distributed Denial of Service (DDoS) scenario will inevitably overwhelm a single node (or nodes) that are forced to handle the DDoS traffic. Other known systems accept that failure of a datacentre will cause disconnection of all VoIP calls that were being processed by that datacentre.

It would therefore be desirable to provide improved media gateway designs, particularly as telecommunications companies embrace NFV.

SUMMARY

According to a first aspect of the present invention, there is provided a media gateway comprising: one or more instantiations of a media session manager function; one or more instantiations of a media processor function; and one or more instantiations of a media session state datastore function, wherein instantiations of the media session manager function and instantiations of the media processor function are separate from instantiations of the media session state datastore function.

According to a second aspect of the present invention, there is provided a method of operating a media gateway, the method comprising: providing one or more instantiations of a media session manager function; providing one or more instantiations of a media processor function; and providing one or more instantiations of a media session state datastore function, wherein instantiations of the media session manager function and instantiations of the media processor function are instantiated separately from instantiations of the media session state datastore function.

According to a third aspect of the present invention, there is provided a computer program comprising a set of instructions, which, when executed by a computerised device, cause the computerised device to perform a method of operating a media gateway, the method comprising: providing one or more instantiations of a media session manager function; providing one or more instantiations of a media processor function; and providing one or more instantiations of a media session state datastore function, wherein instantiations of the media session manager function and instantiations of the media processor function are instantiated separately from instantiations of the media session state datastore function.

Embodiments comprise a non-transitory computer-readable storage medium comprising computer-executable instructions which, when executed by a processor, cause a computing device to perform a method of operating a media gateway.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Embodiments of the present disclosure involve functional decomposition within a media gateway, where each of the functions may be multiply instantiated.

In a Network Function Virtualization (NFV) context, an instance or instantiation corresponds to a virtual instance or virtual instantiation of a network function. A network function that has been virtualized is known as a Virtual Network Function (VNF) which can be instantiated one or more times in a system.

Embodiments provide a valuable way of splitting up a media gateway for finer grained scaling. This provides many benefits including elastic scaling.

Embodiments comprise a media gateway, for example a VoIP media gateway, that is responsible for forwarding RTP sessions and performing policy and interworking functions. The media gateway may for example comprise a Session Border Controller (SBC). Examples of such a gateway comprise an IMS TrGW, an RTP transcoder, or the media element of an SBC.

Each of the functions of embodiments may be multiply instantiated, with anti-affinity (where a given function is not instantiated on the same server, virtual machine, etc.), and may be elastically scaled based on recent and anticipated load. Each of the functions of embodiments may be instantiated on different servers in a cluster. Each of the functions of embodiments may be instantiated on different (compute) servers, virtual machines or containers (any of which may be in different locations).

Function instances of embodiments may use IP-based messaging to communicate with each other. In some embodiments, some or all of the messaging is encrypted.

Embodiments comprise measures, including, methods, apparatus and computer programs, for use in relation to provision of a media gateway (or 'media gateway service') in a telecommunications network.

Figure 1:
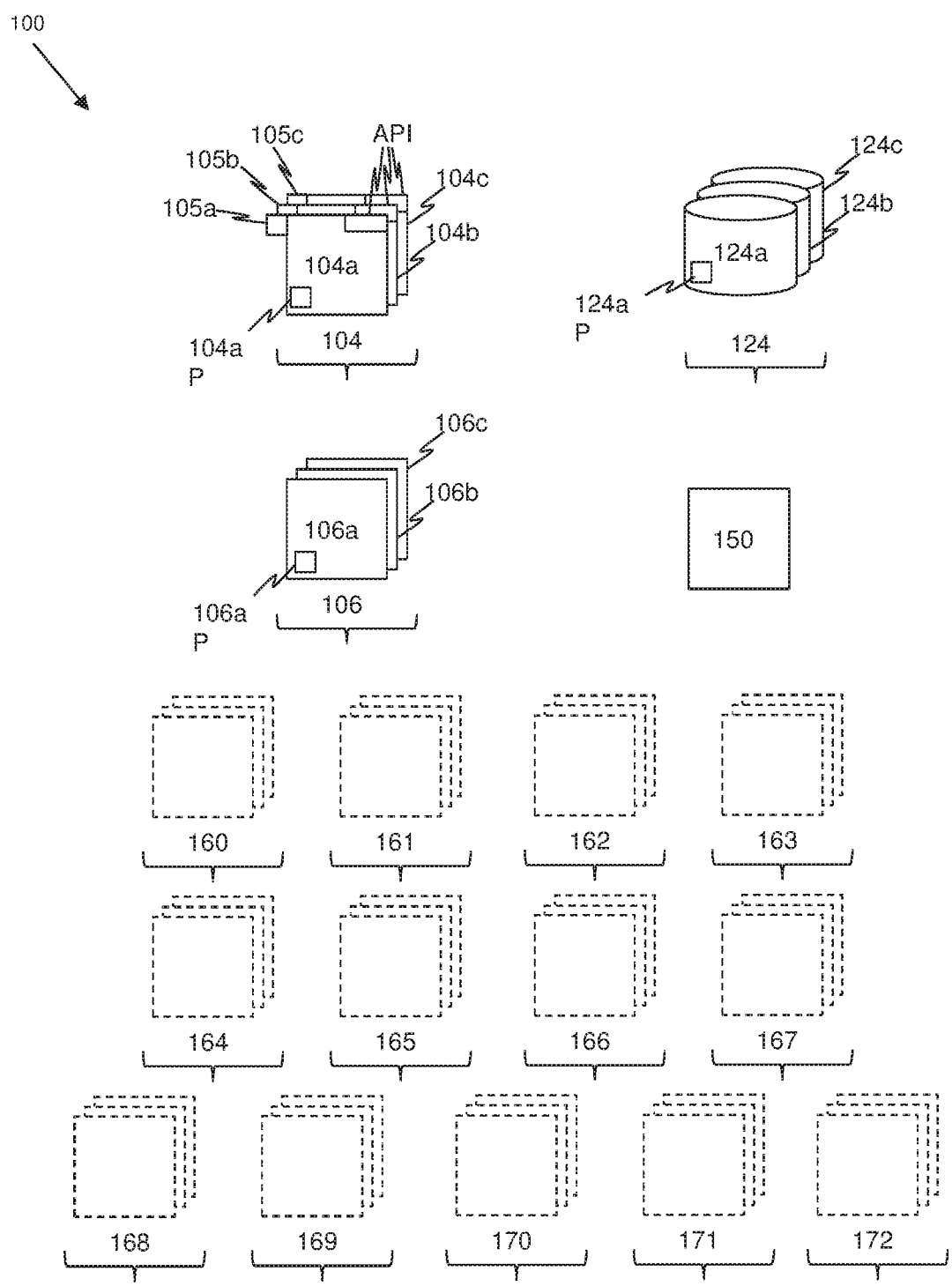
FIG. 1 shows a schematic diagram of a media gateway according to embodiments.

FIG. 1 shows a schematic diagram of a media gateway 100 according to embodiments.

Media gateway 100 comprises one or more instantiations of a media session manager function 104 (in this case, instantiation 104a, instantiation 104b and instantiation 104c), one or more instantiations of a media processor function 106 (in this case, instantiation 106a, instantiation 106b and instantiation 106c), and one or more instantiations of a media session state datastore function 124 (in this case, instantiation 124a, instantiation 124b and instantiation 124c). Instantiations of media session manager function 104 and instantiations of media processor function 106 are separate from instantiations of media session state datastore function 124.

In embodiments, each instantiation has a processor (labelled 10xxP in FIG. 1) for providing various data processing tasks according to embodiments. Instantiations within media gateway 100 are able to communicate with each other via one or more interfaces and/or communication links (not shown), possibly via one or more communication networks or parts thereof (not shown).

In embodiments, the number of instantiations of media session manager function 104 and media session state datastore function 124 are independently scalable of each other. In embodiments, the number of instantiations of media processor function 106 and media session state datastore function 124 are independently scalable of each other. In embodiments, the number of instantiations of media session manager function 104 and media processor function 106 are independently scalable of each other. In embodiments, the number of instantiations for any one of the functions 104, 106, 124 is independent of the number of instantiations of the other functions, which results in independent scalability of the three functions in the media gateway 100.

In embodiments, at least one of the instantiations 104a, 104b, 104c of media session manager function 104 and/or at least one of the instantiations 106a, 106b, 106c of media processor function 106 is physically separate from one or more instantiations 124a, 124b, 124c of media session state datastore function 124.

In embodiments, at least one of the instantiations 104a, 104b, 104c of media session manager function 104 and/or at least one of the instantiations 106a, 106b, 106c of media processor function 106 is virtually separate from one or more instantiations 124a, 124b, 124c of media session state datastore function 124.

In some embodiments, at least one of the instantiations 104a, 104b, 104c of media session manager function 104 and/or at least one of the instantiations 106a, 106b, 106c of media processor function 106 is comprised in a separate datacentre from a datacentre in which one or more instantiations 124a, 124b, 124c of media session state datastore function 124 are comprised. In other embodiments, at least one of the instantiations 104a, 104b, 104c of media session manager function 104 and/or at least one of the instantiations 106a, 106b, 106c of media processor function 106 is comprised in the same datacentre in which one or more instantiations 124a, 124b, 124c of media session state datastore function 124 are comprised.

Traditional RTP media gateways use a unicast IP address to receive packets; in other words, an address that is hosted at a single server instance at any one time. In embodiments of the present disclosure, a media gateway service is decomposed into three main functions. In some embodiments, RTP service of media gateway 100 is delivered using an anycast mechanism where an address such as an IP address is hosted at multiple servers simultaneously. IP anycast allows messages sent to a specific target to be handled by the nearest of a set of potential receivers. IP anycast allows for stateless message processing where there are no requirements for a set of related messages to all arrive at the same receiver.

In embodiments, media gateway 100 is configured with an anycast IP address for receipt of data packets. In some such embodiments, the anycast IP address is hosted at multiple instantiations of the media gateway simultaneously.

In embodiments, media gateway 100 (or 'the media gateway service provided by media gateway 100') is allocated one or more anycast addresses. In embodiments, the service internally consists of multiple server instances, and these may be deployed across multiple datacenters. The edge routers of each datacenter hosting the service advertises IP routing reachability to the IP prefix(es) containing the anycast addresses. Due to the configuration of such embodiments, any RTP packet addressed to the media gateway service may arrive at any of the datacenters hosting the service.

Since IP routing uses a "shortest path" model, the chosen datacenter will generally be the one topologically closest to the sender. Some embodiments are configured such that operators arrange for two or more datacenters to have the same administrative distance from users. In some such embodiments, equal-cost multi-path routing (ECMP) is employed in the IP network to split traffic between the datacenters. This provides a good mitigation strategy for DDoS attacks on a single address, since it means that such an attack cannot focus on a single datacenter, and the load will instead be borne by multiple datacenters.

Since RTP is a real time protocol, it is important to detect and repair faults quickly. Therefore, in embodiments, the IP network that interconnects datacenters and users provides fast detection and rerouting techniques such as bidirectional forwarding detection (BFD) protocol and/or border gateway protocol (BGP) fast convergence techniques. This means that a non-functioning datacenter can be rapidly removed from the pool, and client traffic rerouted to the next closest option.

In embodiments, media session manager function instantiations 104a, 104b, 104c are configured to present a media control protocol Application Programming Interface (API) to users of media gateway 100. In some such embodiments, the media control protocol API comprises a Representational State Transfer (REST) API. In some embodiments, the H.248 ('Megaco') Gateway Control Protocol is employed.

In embodiments, media session manager function instantiations 104a, 104b, 104c are configured to listen on a respective network port 105a, 105b, 105c for media session control requests, update media session state in instantiations of the media session state datastore function and respond to the media session control requests accordingly.

In embodiments, media gateway 100 comprises a load balancer function 150 configured to load balance media session control requests between instantiations 104a, 104b, 104c of media session manager function 104. In embodiments, load balancer function 150 comprises a Hypertext Transfer Protocol (HTTP) load balancer.

In embodiments, media session state datastore function instantiations 124a, 124b, 124c comprise a distributed data store in which media session state data is stored. In embodiments, instantiations 124a, 124b, 124c of media session state datastore function 124 are configured to employ key sharding; such key sharding embodiments may be employed to enable the media gateway service to be horizontally scaled.

In embodiments, each item of data stored in an instantiation 124a, 124b, 124c of media session state datastore function 124 is replicated across other (at least one and possibly all) instantiations of media session state datastore function 124.

In embodiments, media processor function instantiations 106a, 106b, 106c are configured to process Real-time Transport Protocol (RTP) data.

In some embodiments, each media processor function instantiation 106a, 106b, 106c is configured to handle a subset of RTP and RTP Control Protocol (RTCP) data managed by media gateway 100.

In some embodiments, when the first packet(s) of an RTP flow arrive(s) at a media processor instance 106a, 106b, 106c, that instance looks up the relevant media session state from media session state datastore function 124, and retains that state for as long as it needs it. Such embodiments where session state is retrieved reactively can be referred to as "just in time load" embodiments.

In other embodiments, media processor function instantiations 106a, 106b, 106c alternatively (or additionally) retrieve the state of sessions that they are responsible for in advance of any packet from that session arriving. Such embodiments where session state is retrieved proactively can be referred to as "preloading" embodiments.

In some embodiments, media processor function instantiations 106a, 106b, 106c query media session manager function instantiations 104a, 104b, 104c for the state they need, which in turn query them from the media session state datastore function 124.

In some embodiments, media session state is propagated to media processor function instantiations by a push model (such as pub-sub) rather than a pull model.

Figure 2:
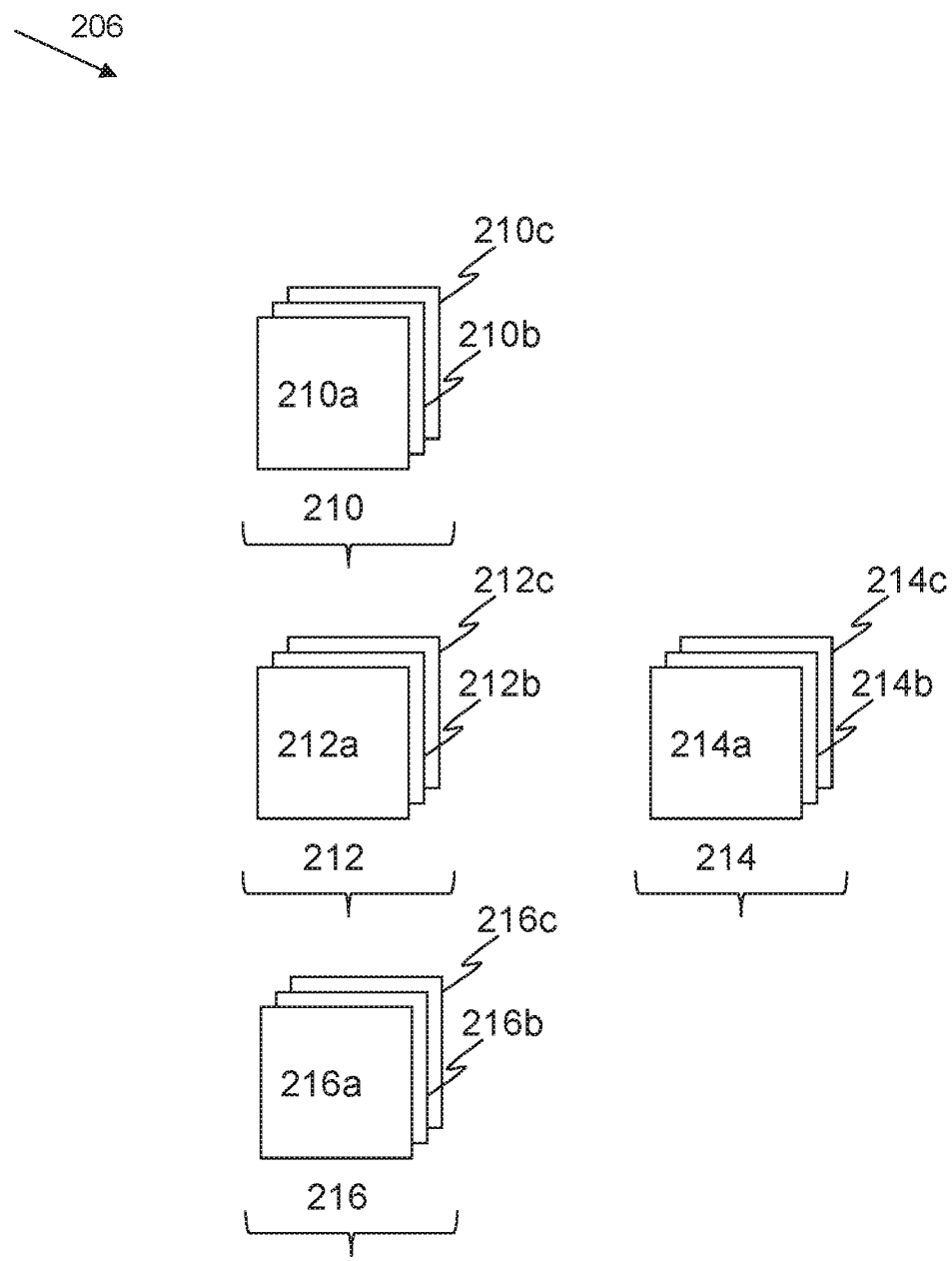
FIG. 2 shows a schematic diagram of a media processor function according to embodiments.

FIG. 2 shows a schematic diagram of a media processor function 206 according to embodiments. Media processor function 206 may for example comprise media processor function 106 of media gateway 100 depicted in FIG. 1.

In embodiments, media processor function 206 is decomposed into four different packet processing sub-functions. Each of these data packet processing sub-functions is also independently scalable. Each of the sub-functions can be considered a tier or layer.

In embodiments, instantiations of media processor function 206 comprise one or more instantiations 210a, 210b, 210c of a routing sub-function 210.

In embodiments, routing sub-function instantiations 210a, 210b, 210c are configured to divide traffic flow into a plurality of sub-flows that can be handled by one or more compute servers, virtual machines or containers of the media gateway. Some such embodiments comprise breaking down the traffic flow into small enough sub-flows that can be handled on an x86 (or other) general-purpose compute server, or a virtual machine or container running on such a server, rather than requiring dedicated routers, switches, network interface cards (NICs), or network processors.

In embodiments, instantiations of media processor function 206 comprise one or more instantiations 212a, 212b, 212c of a flow steering sub-function 212.

In embodiments, instantiations of media processor function 206 comprise one or more instantiations 214a, 214b, 214c of a flow processing sub-function 214.

In embodiments, instantiations of media processor function 206 comprise one or more instantiations 216a, 216b, 216c of a session processing sub-function 216.

In embodiments, flow steering sub-function instantiations 212a, 212b, 212c are configured to ensure that given inbound RTP or RTCP flows are (consistently) routed to single instances of flow processing sub-function 214.

In some embodiments, the hop between flow steering sub-function 212 and flow processing sub-function 214 occurs within a single datacentre. In some embodiments, the hop from flow processing sub-function 214 to session processing sub-function 216 crosses from one datacenter to another. In embodiments, a cross-datacenter hop involves tunnelling encapsulation being added by flow processing sub-function 214.

In embodiments, flow steering sub-function instantiations 212a, 212b, 212c are configured to filter out unwanted traffic that has been sent to the anycast IP address. Unwanted traffic may for example comprise unexpected traffic types (for example that is not RTP or RTCP), traffic that is not part of a programmed flow (for example where the flow is not in the media session state store), or traffic from specific blacklisted addresses.

In embodiments, flow processing sub-function instantiations 214a, 214b, 214c are configured to process RTP and RTCP data. In embodiments, flow processing sub-function instantiations are configured to, determine whether a received request requires session processing, in response to a positive determination, forward the request to a session processing instantiation 216a, 216b, 216c, and, in response to a negative determination, forward the request on an external network interface to an external RTP peer.

In embodiments, flow steering sub-function instances act on policies defining how to route media sessions as follows:

A "latching ports filter" is a filter defining which user datagram protocol (UDP) ports are latching.

A "valid flows filter" is a filter defining which UDP associations (identified by the UDP 4-tuple) are valid.

A "flow steering plan" is a table defining which UDP associations should be directed to which flow processing sub-function instance, and includes backup option(s) that the flow steering sub-function instantiations should choose in case of a failure.

The above policies may be communicated via a regular message published to all flow steering sub-function instances. The filters may comprise Bloom or Cuckoo filters. The flow steering plan may comprise a vbucket model, that is to say, indexed by hashing on the UDP 4-tuple.

The above flow steering sub-function design principles enable unwanted traffic to be filtered out at the earliest possible point, rapid rerouting on failure, and managed rebalancing (more so than a consistent hash model) if one of the flow steering sub-functions or flow processing sub-functions is scaled out or in. The flow steering sub-function hashing function may ensure that related RTP and RTCP flows automatically route to the same instance.

In embodiments, session processing sub-function instantiations 216a, 216b, 216c are configured to act on all RTP and RTCP flows that make up a single media session. In some embodiments, session processing sub-function instantiations 216a, 216b, 216c comprise a transcoding function.

In some embodiments, instantiations of session processing sub-function 216 comprise one or more digital signalling processors (DSPs). Such specialist silicon is able to perform transcoding or other media processing functions more efficiently than can be done on general purpose compute hardware. In other embodiments, transcoding can be performed by software.

Figure 3:
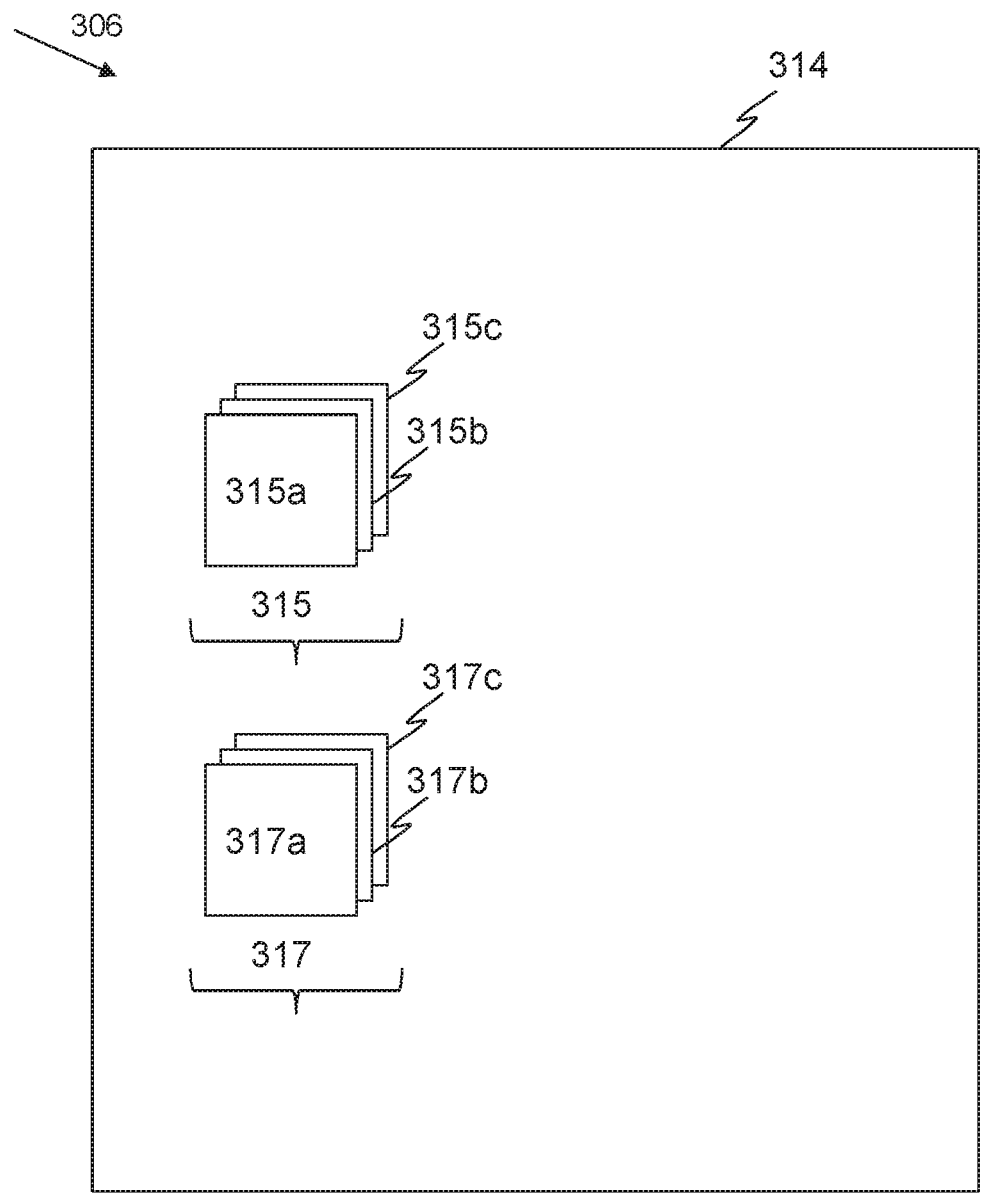
FIG. 3 shows a schematic diagram of a media processor function according to embodiments.

FIG. 3 shows a schematic diagram of a media processor function 306 according to embodiments. Media processor function 306 may for example comprise media processor function 106 of media gateway 100 depicted in FIG. 1.

In embodiments, instantiations of media processor function 306 comprise one or more instantiations of a flow and session processing sub-function 314. In embodiments, instantiations of flow and session processing sub-function 314 comprise one or more instantiations 315a, 315b, 315c of a flow processing sub-sub-function 315. In embodiments, instantiations of flow and session processing sub-function 314 comprise one or more instantiations 317a, 317b, 317c of a session processing sub-sub-function 317.

In embodiments, the number of instantiations of one or more of the following are independently scalable of each other: routing sub-functions 210, flow steering sub-functions 212, flow processing sub-functions 214, session processing sub-functions 216, flow and session processing sub-functions 314, flow processing sub-sub-functions 315, and session processing sub-sub-functions 317.

In embodiments, media gateway 100 is configured to generate notifications, for example of a media event such as receipt of a dual tone multi frequency (DTMF) signal. In some such embodiments, media session state datastore function 124 associates a user notification address or uniform resource locator (URL) with every session. The instance of media processor function 106 that detects the event may for example send a message directly to this address, or may route the notification via an instance of media session manager function 104.

In embodiments, as a mechanism to help avoid state leakage (particularly in failure cases), a user of the media gateway service is required to periodically send a per-session keepalive to media session manager function 104. If a session is not kept alive, media gateway 100 may initiate a state data clean-up process, for example a time to live (TTL) function in media session state datastore function 124.

In order to facilitate communications between and manageability of the various components of media gateway 100 described herein, some additional components may also be used. In embodiments, media gateway 100 comprises one or more of: one or more instantiations of a service discovery function 160, one or more instantiations of a diagnostics collection function 161, one or more instantiations of a monitoring function 162, one or more instantiations of a virtualised network function (VNF) manager 163, one or more instantiations of an orchestrator 164, one or more instantiations of a load balancer 165, one or more instantiations of a licensing service 166, one or more instantiations of a denial of service (DoS) protection function 167, one or more instantiations of an access control function 168, one or more instantiations of a packet filtering function 169, one or more instantiations of a user management function 170, one or more instantiations of an authentication, authorisation, and accounting function 171, and one or more instantiations of a network probe function 172.

In some embodiments, media gateway 100 comprises one or more operations, administration, maintenance, provisioning, and troubleshooting (OAMPT) components.

Embodiments provide an active-active N-way elastic scaling VoIP media gateway which reduces the cost of providing VoIP media services in an NFV environment.

Embodiments provide load balancing and continuity of RTP media streams (and associated RTCP streams) in a system with multiple media processors, presented to the outside IP network as a single entity (with a single anycast (IP) address), where the number of media processors can change over time (for example in response to the level of demand), and media processors can fail.

Embodiments help in avoiding discontinuity in an RTP media stream which may cause audible glitches or periods of silence to the participants in a call.

Embodiments enable graceful handling of datacenter failover by ensuring that RTP streams continue to be processed by one or more other datacenter(s) without needing to reprogram the RTP streams.

Embodiments provide DoS protection by spreading the 'bad' packets across many media processors which makes it harder to overwhelm a single media processor.

Embodiments enable an N-way redundancy model and separate scaling of media handling and control functions. The N-way redundancy model allows redundancy to be provided with lower overall spare capacity. For example, a cluster of ten instances in an N-way redundancy model can support 80% more capacity than five active-standby instance pairs whilst still providing protection against failure of a single instance. Embodiments work across multiple datacenters, thus giving greater uptime than can be achieved with a single datacentre.

The separate scaling of embodiments also provides significant cost savings in a deployment that has an atypical or fluctuating proportion of DDoS traffic, control traffic, or transcoding, since it allows the instances handling this traffic to scale independently. This helps avoid compute resource being allocated for functionality that is not actually needed.

Embodiments comprise a method of operating a media gateway, the method comprising: providing one or more instantiations of a media session manager function; providing one or more instantiations of a media processor function; and providing one or more instantiations of a media session state datastore function, wherein instantiations of the media session manager function and instantiations of the media processor function are instantiated separately from instantiations of the media session state datastore function.

Embodiments comprise a computer program comprising a set of instructions, which, when executed by a computerised device, cause the computerised device to perform a method of operating a media gateway, the method comprising: providing one or more instantiations of a media session manager function; providing one or more instantiations of a media processor function; and providing one or more instantiations of a media session state datastore function, wherein instantiations of the media session manager function and instantiations of the media processor function are instantiated separately from instantiations of the media session state datastore function.

Embodiments comprise providing a media gateway service, the method comprising: instantiating one or more instances of a media session manager function; instantiating one or more instances of a media processor function; and instantiating one or more instances of a media session state datastore function, wherein instances of the media session manager function are instantiated separately from instances of the media session state datastore function, and wherein instances of the media processor function are instantiated separately from instances of the media session state datastore function.

In some such embodiments, instances of the media session manager function are instantiated separately from instances of the media processor function.

One or more of the aspects of the embodiments described herein with reference to the drawings comprise processes performed by one or more entities such as media gateways, network nodes, switches, servers, etc. In embodiments, the one or more entities comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples of the invention. Further embodiments of the invention are envisaged.

Examples depicted in the figures and described herein include three instantiations of one or more functions, sub-functions or sub-sub-functions purely for exemplary purposes. Embodiments may equally apply where the number of instantiations is different to three.

Some embodiments have been described herein in relation to RTP. Embodiments may also be applied in relation to any system where load-balancing across different data centres (or geo-redundancy) is desirable. Embodiments may be applied to other applications in the NFV space, as well as other cloud-based service platforms.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A media gateway comprising: at least one processor and a non-transitory computer-readable medium containing computer-executable instructions which, when executed by the at least one processor, cause, the at least one processor to:
provide, in the media gateway, virtual instantiations of a media session manager function;
provide, in the media gateway, virtual instantiations of a media processor function; and
provide, in the media gateway, virtual instantiations of a media session state datastore function,
wherein the instantiations of a media processor function are configured to process data packets,
wherein the instantiations of the media session state datastore function comprise a distributed data store for storing media session state data,
wherein the instantiations of the media session manager function are configured to listen for media session control requests, update media session states stored in instantiations of a media session state datastore function, and respond to the media session control requests, and
wherein instantiations of the media session manager function and instantiations of the media processor function are separate from instantiations of the media session state datastore function, and instantiations of the media session manager function are separate from instantiations of the media processor function.

2. A media gateway according to claim 1, wherein the number of instantiations of the media session manager function and media session state datastore function are independently scalable of each other.

3. A media gateway according to claim 1, wherein the number of instantiations of the media processor function and media session state datastore function are independently scalable of each other.

4. A media gateway according to claim 1, wherein the number of instantiations of the media session manager function and media processor function are independently scalable of each other.

5. A media gateway according to claim 1, wherein at least one of the instantiations of the media session manager function and/or at least one of the instantiations of the media processor function is physically separate from one or more instantiations of the media session state datastore function.

6. A media gateway according to claim 1, wherein media session manager function instantiations are configured to present a media control protocol Application Programming Interface (API) to users of the media gateway.

7. A media gateway according to claim 1, wherein the computer-executable instructions further causes the at least one processor to provide a load balancer function configured to load balance media session control requests between instantiations of the media session manager function.

8. A media gateway according to claim 1, wherein each item of data stored in an instantiation of the media session state datastore function is replicated across other instantiations of the media session state datastore function.

9. A media gateway according to claim 1, wherein media processor function instantiations are configured to process Real-time Transport Protocol (RTP) data.

10. A media gateway according to claim 1, wherein media processor function instantiations comprise one or more instantiations of a flow steering sub-function.

11. A media gateway according to claim 1, wherein media processor function instantiations comprise one or more instantiations of a flow processing sub-function.

12. A media gateway according to claim 1, wherein media processor function instantiations comprise one or more instantiations of a session processing sub-function.

13. A media gateway according to claim 12, wherein session processing sub-function instantiations are configured to act on all Real-time Transport Protocol (RTP) and Real-time Transport Control Protocol (RTCP) flows that make up a single media session.

14. A media gateway according to claim 1, wherein the media gateway comprises a Session Border Controller (SBC).

15. A media gateway according to claim 1, wherein the media gateway comprises one or more of:
  a Voice over Internet Protocol (VoIP) media gateway,
  an Internet Protocol Multimedia Subsystem (IMS) Transition Gateway (TrGW),
  an Real-time Transport Protocol (RTP) transcoder, and
  a media element of an Session Border Controller (SBC).

16. A media gateway according to claim 1, wherein the computer-executable instructions further causes the at least one processor to provide one or more of:
  one or more instantiations of a service discovery function,
  one or more instantiations of a diagnostics collection function,
  one or more instantiations of a monitoring function,
  one or more instantiations of a virtualised network function (VNF) manager,
  one or more instantiations of an orchestrator,
  one or more instantiations of a load balancer,
  one or more instantiations of a licensing service,
  one or more instantiations of a denial of service (DoS) protection function,
  one or more instantiations of an access control function,
  one or more instantiations of a packet filtering function,
  one or more instantiations of a user management function,
  one or more instantiations of an authentication, authorisation, and accounting function, and
  one or more instantiations of a network probe function.

17. A method of operating a media gateway, the method comprising:
  providing virtual instantiations of a media session manager function;
  providing virtual instantiations of a media processor function; and
  providing virtual instantiations of a media session state datastore function,
  wherein the instantiations of a media processor function are configured to process data packets,
  wherein the instantiations of the media session state datastore function comprise a distributed data store for storing media session state data,
  wherein the instantiations of the media session manager function are configured to listen for media session control requests, update media session state stored in instantiations of a media session state datastore function, and respond to the media session control requests, and
  wherein instantiations of the media session manager function and instantiations of the media processor function are instantiated separately from instantiations of the media session state datastore function, and instantiations of the media session manager function are instantiated separately from instantiations of the media processor function.

18. A non-transitory computer-readable medium comprising a set of instructions, which, when executed by a computerised device, cause the computerised device to perform a method of operating a media gateway, the method comprising:
  providing virtual instantiations of a media session manager function;
  providing virtual instantiations of a media processor function; and
  providing virtual instantiations of a media session state datastore function,
  wherein the instantiations of a media processor function are configured to process data packets,
  wherein the instantiations of the media session state datastore function comprise a distributed data store for storing media session state data,
  wherein the instantiations of the media session manager function are configured to listen for media session control requests, update media session states stored in instantiations of a media session state datastore function, and respond to the media session control request, and
  wherein instantiations of the media session manager function and instantiations of the media processor function are instantiated separately from instantiations of to media session state datastore function, and instantiations of the media session manager function are instantiated separately from instantiations of the media processor function.

* * * * *